Dec. 12, 1933.  E. W. REYNOLDS  1,939,522
PHOTO-ACOUSTIC CINEMATOGRAPHIC APPARATUS
Original Filed March 17, 1930  3 Sheets-Sheet 1

WITNESSES:

INVENTOR
Ellwood W. Reynolds.
BY
ATTORNEY

Dec. 12, 1933. E. W. REYNOLDS 1,939,522
PHOTO-ACOUSTIC CINEMATOGRAPHIC APPARATUS
Original Filed March 17, 1930 3 Sheets-Sheet 2

WITNESSES:
C. J. Weller
Hyman Diamond

INVENTOR
Ellwood W. Reynolds.
BY F. W. Seyle
ATTORNEY

Dec. 12, 1933.   E. W. REYNOLDS   1,939,522
PHOTO-ACOUSTIC CINEMATOGRAPHIC APPARATUS
Original Filed March 17, 1930    3 Sheets-Sheet 3

WITNESSES:
C. J. Weller.
Hyman Diamond

INVENTOR
Ellwood W. Reynolds.
BY F. W. Lyle.
ATTORNEY

Patented Dec. 12, 1933

1,939,522

UNITED STATES PATENT OFFICE 1,939,522

PHOTO-ACOUSTIC CINEMATOGRAPHIC APPARATUS

Ellwood W. Reynolds, Drexel Hill, Pa., assignor to Westinghouse Electric & Manufacturing Company, a corporation of Pennsylvania Original application March 17, 1930, Serial No. 436,552. Divided and this application January 6, 1933. Serial No. 650,375

4 Claims. (Cl. 88—16.2)

My invention relates to photo-acoustic cinematographic apparatus and it has particular relation to domestic equipment of this type.

The present application is a division of my application Serial No. 436,552, filed March 17, 1930 and assigned to Westinghouse Electric and Manufacturing Company, assignee of the present application.

The conditions and requirements imposed on acoustic-cinematographic equipment intended for home use are by far more numerous and stringent than those imposed on theatre apparatus.

A theatre machine is ordinarily installed as a permanent fixture in a booth and is handled only by experienced operators. A domestic machine, on the other hand, to have universal popularity, and hence, to be commercially successful, must have universal adaptability. It must, consequently, be small and portable and must lend itself to operation by an unskilled person.

Moreover, the owner of a domestic machine has the opportunity of scrutinizing the entertainment produced by such machine more continually, and, consequently, more critically, than he observes the offering of a theatre machine. As a result, domestic acoustic-cinematographic equipment must be capable of delivering better quality than the theatre equipment.

Another consideration that further accentuates the rigorous requirement of quality arises from the fact that a considerable rental must of necessity be levied on the owner of a domestic machine for the use of the film. The expense of the film also adds the condition that the machine shall have no deleterious effect upon it.

In acoustic-cinematographic equipment made according to the teachings of the prior art with which I am familiar, the sound is disposed in the form of a spiral groove on a wax record that is rotated in synchronism with the projection machine. The numerous difficulties involved in the manufacture and operation of a composite machine of this type are obvious.

By reason of the limitations present in the structure of the material involved in the production of a wax record, the maximum period of continuous performance that can be obtained with a disc machine is ten minutes. However, a ten minute performance requires a sixteen-inch disc and, consequently, renders the machine rather cumbersome.

Insignificant though it may seem, the matter of positioning the needle on the disc in such manner that the sound is tolerably synchronous with the picture, requires certain perserverance and has proved an insurmountable difficulty to many an amateur operator.

Finally, the care of the film used in the disc cinematographic machine demands the skill and diligence with which only experienced operators are equipped. Hence, the permanent ownership of favorite films and their corresponding records, a highly desirable institution from the standpoint of both the amateur and the picture producer, is not feasible.

It is, accordingly, an object of my invention to provide domestic acoustic-cinematographic apparatus wherein the permanent sound record is disposed as a photographic strip, on the film, contiguous to the picture.

Another object of my invention is to provide a portable photo-acoustic-cinematographic machine particularly adapted for home use.

A still further object of my invention is to provide domestic photo-acoustic-cinematographic equipment capable of delivering entertainment of exceptionally good quality.

More specifically stated, it is an object of my invention to provide photo-acoustic-cinematographic apparatus that shall be simple and light in its structure, comprise a minimum number of parts and be adapted to inexpensive manufacture in large quantities.

According to my invention, I provide a cinematographic machine, with acoustic attachment, wherein certain rotating parts are coaxial and the film is skewed in accordance with the location of these parts, advantage thus being taken of the total volume bounding the machine.

The novel features that I consider characteristic of my invention are set forth with particularity in the appended claims. The invention itself, however, both as to its organization and its method of operation, together with additional objects and advantages thereof, will best be understood from the following description of a specific embodiment, when read in connection with the accompanying drawings, in which Figure 1 is a view, in perspective, of the equipment comprising my invention as it appears during operation;

Figure 1:
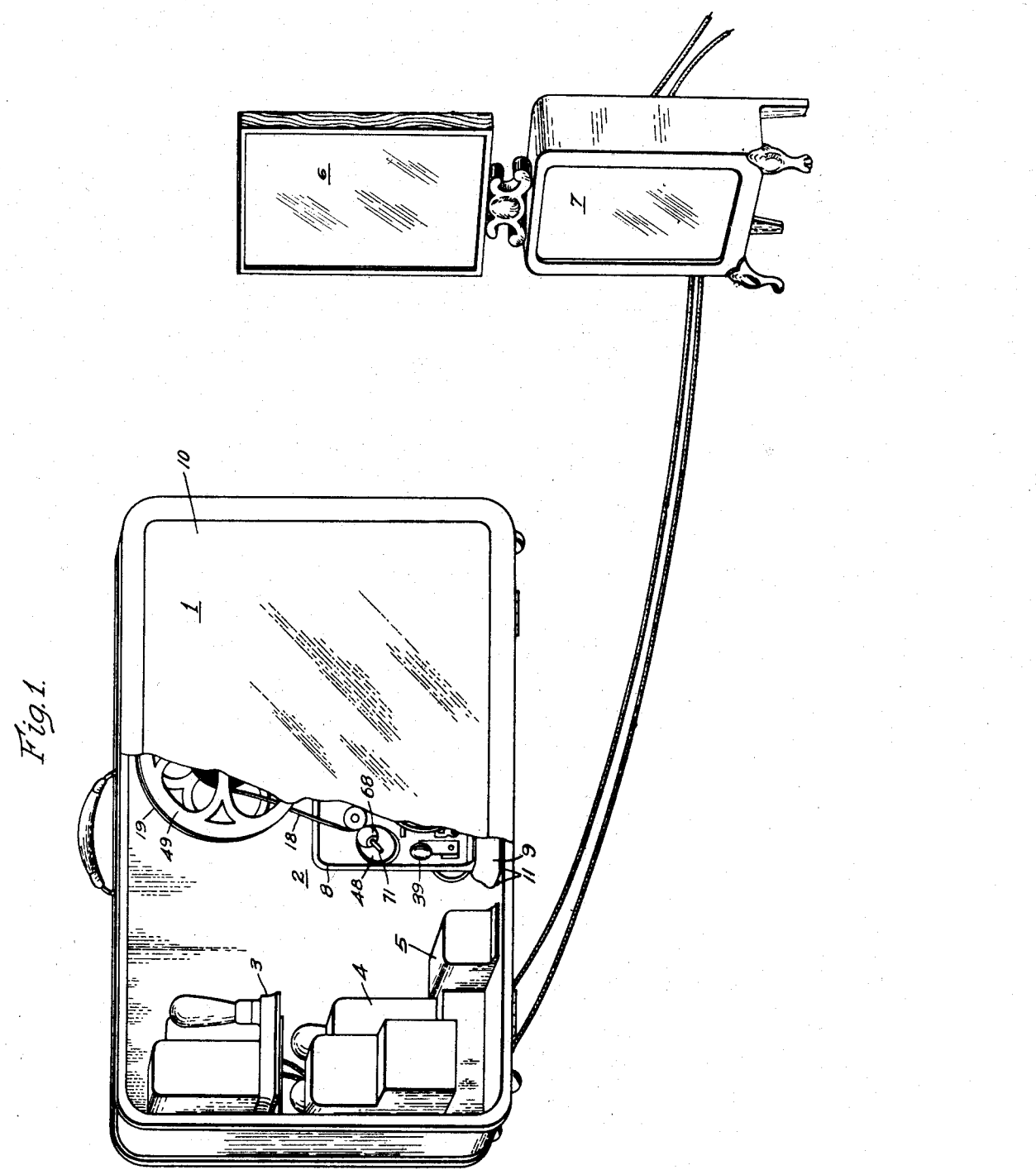
Figure 2:
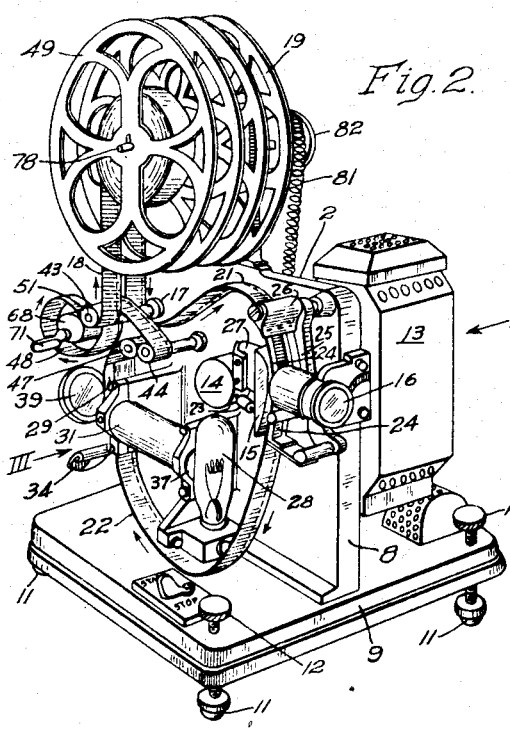
Fig. 2 is a view, in perspective, of an acoustic-cinematographic machine constructed according to my invention.
Figure 3:
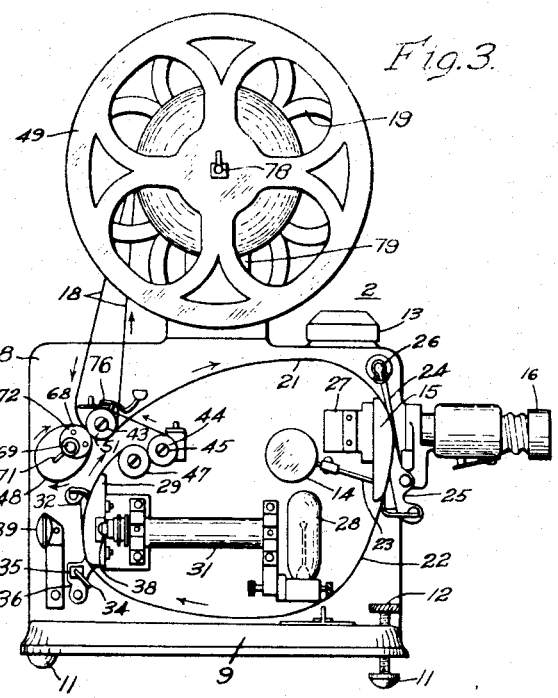
Fig. 3 is a view, in side elevation, of the machine, taken in the direction III of Fig. 2.
Figure 4:
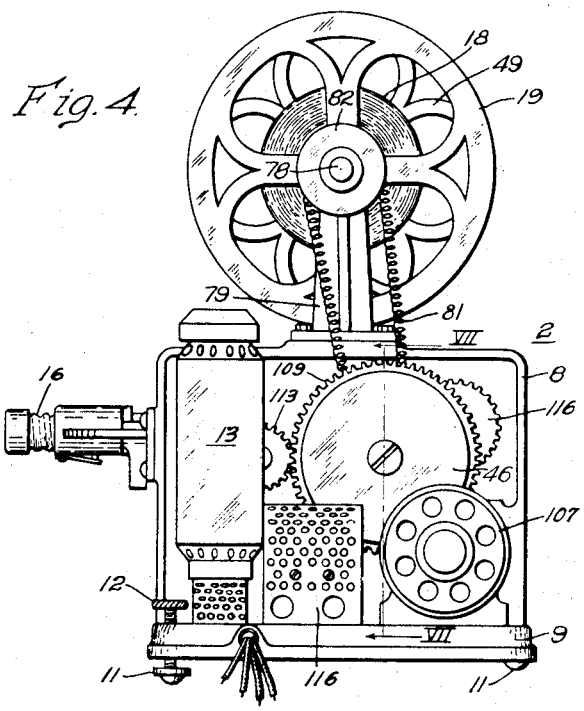
Fig. 4 is a view, in side elevation, of the machine taken in the direction IV of Fig. 2.

The apparatus shown in Fig. 1 comprises a carrying case 1 wherein a photo-acoustic-cinematographic projector 2, together with a power-supply unit 3, an amplifier 4 and a transformer 5, capable of delivering the voltage necessary for a sound-exciting lamp, are disposed. An opening is provided in the carrying case 1 through which an image of the picture contained on the film is projected on a screen 6. The latter, together with a loudspeaker 7, constitute a separate unit. To facilitate threading of the film, the carrying case is provided with a side door 10, hinged along its lower edge and swingable, under the influence of gravity, to an open position.

The photo-acoustic-cinematographic projector 1 is provided with a cast upright plate 8, whereon the necessary accessories of a projector are disposed, as will be hereinafter described. The upright plate is fastened to a base plate 9 equipped with a plurality of supporting studs 11, certain of which are provided with adjusting screws 12 that facilitate the vertical positioning of the picture on the screen.

The picture-projection system is described in detail in a copending application of Mr. C. R. Hanna, Serial No. 441,583, filed April 4, 1930, and assigned to the Westinghouse Electric and Manufacturing Company. For the present purpose, it is sufficient to say that it comprises principally a projection-light source 13 supported on the rear side of the upright plate 8, and an intermittent movement 14, a gate 15 and a projection lens-housing 16 supported on the front side of the plate 8.

A feed sprocket 17 delivers a film strip 18 from the feeding reel 19 to a loop reservoir 21, from which it is intermittently advanced through the gate 15 into a second loop reservoir 22 by a plurality of claws rigidly supported on a rod 23 that is intermittently actuated, as specifically described in the aforementioned application of C. R. Hanna.

The film gate 15 is equipped with a plurality of tensioned shoe straps 24 supported on a bracket 25 pivotally mounted on a stud 26 fastened in the plate 8. The straps 24 exert a resilient pressure on the margins of the film 18 and cause it to present, at the picture aperture, a uniform surface that is invariable in its position along the optic axis of the condensing and projection system. The film is illuminated at the aperture by the light from the source 13 which is projected through an opening in the vertical plate and is reflected to the aperture by a vertical mirror 27, the reflecting plane of which is at an angle of 45° to the optic axis.

The sound-exciting system comprises an exciting lamp 28, an optical system and a sound gate 29, all supported on the front side of the upright plate 8.

The film 18 passes under the sound lamp 28 and the telescopic tube 31 of the optical system and is resiliently positioned in the gate 29 by a plurality of tensioned shoe-straps 32, similar in design to those of the picture gate. The straps 32 are supported on a bracket 33 that is pivotally movable relative to the aperture plate of the sound gate 29 by the coaction of a manually operated bell crank lever 34, an eccentric cam 35 and a square cam follower 36.

The telescope tube 31 of the optical system contains a condenser 37, a horizontal slit (not shown) illuminated by the condensed light from the horizontal filament of the exciting lamp and a microscope objective 38 that casts a reduced image of the slit on the film 18. In addition to the telescope tube and its appurtenances, the optical system includes a simple lens 39, the function of which is to reduce the cross section of the light beam that impinges on the photocell cathode.

As is well known to those skilled in the talking-motion-picture art, comparatively small irregularities in the speed of a photo-acoustic film, as it passes through the sound gate, appear as distortions in the sound that tend to give it rather disagreeable characteristics. On the other hand, by reason of the non-uniformity in the shrinkage property of the film, the sprocket-hole pitch varies over a considerable range for various films, and, consequently, since it is not possible to design a sprocket having a sprocket-tooth pitch corresponding to all films, sprockets are ordinarily made to correspond in pitch to the smallest film. It follows that the problem of constant film-speed is not solved by merely employing a sprocket rotating at a substantially constant angular velocity, since, by reason of the discrepancy between the tooth pitch and the sprocket-hole pitch, it is ordinarily necessary that the film shall stop and the sprocket shall move relative to it for a certain fraction of the period during which a frame is advanced. The distortion resulting from this relative motion renders the sound exceedingly objectionable.

To overcome these difficulties, I provide a device described in detail in a copending application of C. R. Hanna and E. H. Greibach, Serial No. 406,847, filed November 13, 1929 and assigned to Westinghouse Electric and Manufacturing Company. A sprocket 42 is resiliently mounted on the shaft 43 of the feed sprocket 17, as will presently be described, to advance the film 18 through the sound gate 29. The yielding connection between the sprocket and the shaft adapts the sprocket teeth to adjust themselves to the sprocket holes and to advance the film at a uniform speed.

However, as the film has a rather small mass per unit length, while the sprocket has a considerable mass, means is provided to increase the effective inertia of the film, and thus to render it unyielding under the action of the spring-actuated sprocket teeth. The continuance for increasing the inertia of the film comprises a film-driven roller 44, rigidly mounted near one end of a shaft 45, on the other end of which a flywheel 46 is centrally located.

Since the torque applied by the film to pull the inertia idler and the frictional force preventing the film from moving relative to the idler both increase with the angle of wrap of the film around the roller, it is desirable that this angle shall be as large as the limitations of the apparatus permit. A preferred arrangement for increasing the angle of wrap is shown in the present embodiment of my invention and comprises a roller 47 properly disposed between the inertia idler 44 and the sound gate 29.

The resilient sprocket 42 feeds the film 18 into a third loop reservoir 48, whence it is delivered to a take-up reel 49 by a hold-back sprocket 51 rigidly fastened to the shaft 43 of the feed sprockets and rotatable therewith. It is to be noted that, as the three sprockets are coaxial, the film must pass under the first feed sprocket, over the second feed sprocket and under the hold-back sprocket. As the first feed sprocket 17 and the hold-back sprocket 51 are interposed between the reels 19 and 49 and the remaining mechanisms and tend to regulate the speed of the film 18 as it is removed from the feeding reel 19 and as it is wound on the take-up reel 49, they are customarily termed insulating sprockets.

The film strip 18 is retained in engagement with the sprockets by a plurality of pads 68 eccentrically mounted on a shaft 69. Each pad 68 is rotatable relative to the shaft 69 and is moved into or out of engagement with its corresponding sprocket 17, 42 or 51 by a lever 71 provided with a disc 72 that is rigidly screwed to one base of the stud 68.

As the film 18 has a tendency to adhere to the sprocket surface, a stripper 76 is mounted on the upright plate 8 adjacent to the sprockets. The stripper is equipped with a plurality of tongues 77 adapted to engage the sprockets between the film-supporting flanges.

The reels are mounted on a spindle 78 rotatably supported in a bored bracket 79 and driven by a belt 81 that engages a pulley 82 rigidly mounted on one end thereof. The spindle 78 is provided with a slot near its other end wherein a key 83 is slidably held by a pin 84 that, in traversing the shaft 78, engages it in a slot 85. The key 83 is supported on a plurality of springs 86 that yieldingly project it from the slot and enable it to interlock with a key-way provided in the take-up reel 49.

Centrally located on the spindle is a cylindrical bushing 87 having a T-shape longitudinal section. The stem 88 of the bushing is provided with a notched key 89 that engages the feeding reel 19 and causes it to rotate the bushing as it is rotated by the film 18. The notch in the key 89 prevents the reel from becoming disengaged from the bushing 87 by reason of the existing directional irregularities in the torque exerted by the film.

Figure 5:
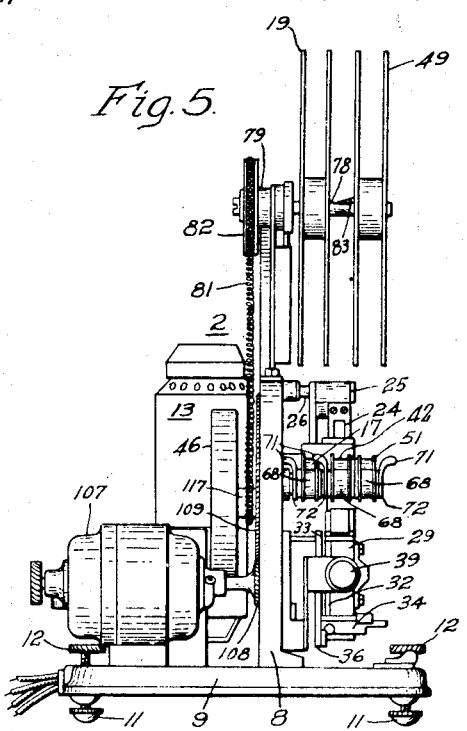
Fig. 5 is a view, in rear elevation, of the machine.
Figure 6:
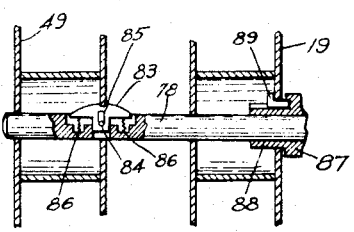
Fig. 6 is a view in section showing the reels and their support.
Figure 7:
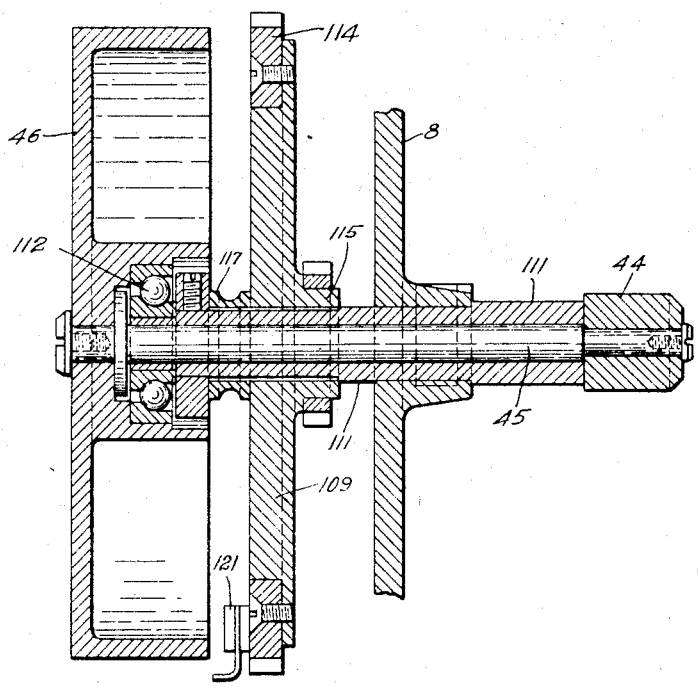
Fig. 7 is a view in section taken along line VII—VII of Fig. 4 and showing the film driven flywheel and its associated structure.
Figure 8:
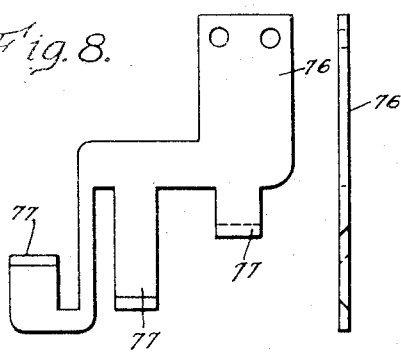
Fig. 8 is a view, in front elevation, of the film stripper.
Figure 9:
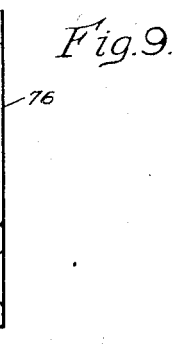
Fig. 9 is a view, in side elevation, of the film stripper.

The film-advancing mechanisms are primarily actuated from a motor 107, located on the base plate 9 of the machine 1, as shown in Fig. 5. The power from the motor is transmitted, through a pinion 108 fastened to the motor shaft, to a gear wheel 109 located coaxially with the inertia idler 44.

By reason of the fact that it is obviously undesirable that the power-driven gear wheel 109 shall coact with the film-driven shaft 45 of the inertia idler, a bushing 111 is disposed between the shaft and the gear wheel, and the former rotates within the bushing while the latter rotates externally thereto. The bushing 111 also serves as a support for a ball bearing 112 whereon the inertia roller 46, associated with the idler 44, is mounted.

The gear wheel 109 transmits a portion of its power to the intermittent movement 14, through a second gear wheel 113 meshing therewith. The shutter is centrally located on the intermittent cam shaft. A pinion 114, pressed in a cylindrical extension 115 of the first gear wheel 109 and rotating with it, transmits the necessary power to the sprocket shaft 43 through a third gear wheel 116. The pulley 117, through which the reel spindle 78 is driven, is cut integral with the first gear wheel 109.

Although I have shown and described a certain specific embodiment of my invention, I am fully aware that many modifications thereof are possible. My invention, therefore, is not to be restricted except insofar as is necessitated by the prior art and by the spirit of the appended claims.

I claim as my invention:

1. Acousto-cinematographic apparatus comprising a feeding reel, means for continuously delivering a film-strip from said reel, a picture gate, means for advancing said film intermittently through said picture gate, a sound gate, an inertia roller, means for continuously advancing said film through said sound gate and over said inertia roller, and means for continuously delivering said film to a take-up reel, said continuous film-advancing and film-delivering means being disposed on one shaft and said reels being disposed on another shaft.

2. Acousto-cinematographic apparatus comprising a feeding reel, means for continuously delivering a film strip from said reel, a picture gate, means for advancing said film intermittently through said picture gate, a sound gate, means for continuously advancing said film through said sound gate, and means for continuously delivering said film to a take-up reel, said continuous film-advancing and film-delivering means being disposed on a single shaft.

3. Acousto-cinematographic apparatus comprising means for storing a film the pictures and records on which are to be projected and reproduced, means for projecting images of the pictures impressed on said film, means for subjecting said film to the influence of said projecting means, means for advancing said film to said subjecting means, means for intermittently advancing said film through said subjecting means, means for translating a sound record impressed on said film into sound energy, means for subjecting said film to said translating means, means, including an inertial roller to be motivated solely by the frictional force of the film and film-advancing means, for advancing said film through said last-named subjecting means, means for storing said film after the pictures and records impressed thereon have been projected and reproduced, means for advancing said film, to said storing means, a motor, a gear mounted coaxial with said inertial roller and coupled to said motor to be rotated thereby, another gear mounted coaxial with said first-named gear and secured thereto, means for driving said intermittent film-advancing means coupled to said first-named gear and means for driving said other film-advancing means coupled to said other gear.

4. Acousto-cinematographic apparatus for projecting the image impressed on a film and for reproducing the sound record impressed thereon comprising means for projecting the image impressed on said film, means for intermittently advancing said film through said projecting means, means for translating the sound record impressed on said film, means, including an inertial roller to be film-driven and a roller to be power-driven, for advancing said film through said translating means, a motor, a gear mounted coaxial with said inertial roller, and coupled to said motor to be rotated thereby, a second gear mounted coaxial with said first-named gear and secured thereto, means for driving said intermittent advancing means coupled to said first-named gear and means for driving said film-advancing roller coupled to said other gear.

ELLWOOD W. REYNOLDS.